(12) United States Patent
Uchiyama

(10) Patent No.: US 7,511,237 B2
(45) Date of Patent: Mar. 31, 2009

(54) LEVER SWITCH MOUNTING STRUCTURE

(75) Inventor: Norio Uchiyama, Tokyo (JP)

(73) Assignee: Niles Co., Ltd., Tokyo (JP)

( * ) Notice: Subject to any disclaimer, the term of this patent is extended or adjusted under 35 U.S.C. 154(b) by 0 days.

(21) Appl. No.: 11/661,461

(22) PCT Filed: Aug. 24, 2005

(86) PCT No.: PCT/JP2005/015320

§ 371 (c)(1),
(2), (4) Date: Mar. 22, 2007

(87) PCT Pub. No.: WO2006/022279

PCT Pub. Date: Mar. 2, 2006

(65) Prior Publication Data

US 2007/0284231 A1   Dec. 13, 2007

(30) Foreign Application Priority Data

Aug. 25, 2004   (JP) ............................ 2004-245806

(51) Int. Cl.
*H02H 9/00* (2006.01)
(52) U.S. Cl. ................. 200/61.54; 200/61.55
(58) Field of Classification Search .............. 200/61.54, 200/61.55, 61.56; 280/731, 728.3, 779, 775; 439/15, 34, 164; 74/552, 493, 494
See application file for complete search history.

(56) References Cited

U.S. PATENT DOCUMENTS

| | | | | |
|---|---|---|---|---|
| 5,747,763 A | * | 5/1998 | Uchiyama et al. | ........ 200/61.54 |
| 5,766,019 A | | 6/1998 | Matsumoto et al. | |
| 5,780,796 A | * | 7/1998 | Uchiyama et al. | ........ 200/61.54 |
| 5,883,348 A | | 3/1999 | Yokoyama | |
| 6,025,565 A | | 2/2000 | Miyase et al. | |
| 6,053,742 A | * | 4/2000 | Matsumoto et al. | ........... 439/15 |
| 6,222,142 B1 | | 4/2001 | Sano | |
| 6,227,865 B1 | * | 5/2001 | Matsumoto et al. | ........... 439/15 |

(Continued)

FOREIGN PATENT DOCUMENTS

JP          09-076826          3/1997

(Continued)

*Primary Examiner*—Michael A Friedhofer
(74) *Attorney, Agent, or Firm*—Jordan and Hamburg LLP

(57) ABSTRACT

To provide a structure in which a rotary connector, a turning signal switch and a wiper switch can be combined into a sub-assembly, and besides even when an unduly-large force acts on the turning signal switch or the wiper switch after the rotary connector and the two switches are mounted on their respective mounting portions, an adverse effect of this force on the rotary connector can be suppressed.

A lever switch mounting structure includes provisionally-retaining means for provisionally retainingly engaging a turning signal switch and a wiper switch respectively with a rotary connector before these switches and the rotary connector are mounted on their respective mounting seats, and fastening tongue portions which are provided respectively at the turning signal switch and the wiper switch, and are opposed to their respective switch mounting seats with a gap formed therebetween when the rotary connector, provisionally retainingly engaged with these switches, is mounted on the connector mounting seats, and when the fastening tongue portions are moved together with the turning signal switch and the wiper switch in a direction to eliminate the gaps, and are connected respectively to the switch mounting seats, the provisionally-retained conditions of the provisionally retaining means are canceled.

9 Claims, 4 Drawing Sheets

U.S. PATENT DOCUMENTS

| | | | |
|---|---|---|---|
| 6,246,128 B1 * | 6/2001 | Sugata | 307/10.1 |
| 6,403,900 B2 * | 6/2002 | Hecht et al. | 200/61.54 |
| 6,956,177 B2 * | 10/2005 | Tanaka | 200/61.54 |

FOREIGN PATENT DOCUMENTS

| | | |
|---|---|---|
| JP | 09-120754 | 5/1997 |
| JP | 9-320724 | 12/1997 |
| JP | 11-250772 | 9/1999 |
| JP | 2000-159036 | 6/2000 |
| JP | 2000-211440 | 8/2000 |
| JP | 2002-014495 | 1/2002 |
| JP | 2003-054332 | 2/2003 |

* cited by examiner

LEVER SWITCH MOUNTING STRUCTURE

BACKGROUND OF THE INVENTION

This invention relates to a structure of mounting a lever switch such as a turning signal switch and a wiper switch.

For example, there is known a conventional lever switch mounting structure shown in FIG. 5. Lever switches, shown in FIG. 5, are, for example, a turning signal switch 101 and a wiper switch 103.

The turning signal switch 101 and the wiper switch 103 are fitted respectively in switch mounting ports 107 and 109 formed in a base 105, and each of these switches 101 and 103 is fixed to the base 105 by its engagement claws 111 resiliently engaged with the base 105. A fastening portion 113 and engagement claws 115 are provided at the base 105. Further, insertion holes 117 are formed in the base 105, and a retaining claw 119 is provided at an inner end of each insertion hole 117. A fastening piece portion 123 and engagement leg portions 125 are formed on a rotary connector 121.

The leg portions 125 of the rotary connector 121 are inserted respectively into the insertion holes 117 in the base 105, and are retained by the retaining claws 119, respectively. The turning signal switch 101 is fitted into the switch mounting port 107 to be mounted therein, and the wiper switch 103 is fitted into the switch mounting port 109 to be mounted therein.

The base 105 is mounted on a steering column 127, and retaining portions 131 of a bracket 129 are retainingly engaged with the engagement claws 115, respectively, and the fastening portions 123 and 113 are both fastened to a mounting portion 135 by a screw 133.

As a result, the turning signal switch 101, the wiper switch 103 and the rotary connector 121 are all mounted on the bracket 129 mounted on the steering column 127.

The turning signal switch 101, the wiper switch 103 and the rotary connector 121 are thus mounted on the base 105, and therefore before the turning signal switch 101, the wiper switch 103 and the rotary connector 121 are mounted on the bracket 129, these parts can beforehand be combined into a sub-assembly. Therefore, the handling of the parts during the assembling operation, the management of the parts, the transport of the parts, etc., can be easily carried out.

In the above structure, however, when an unduly-large operating force acts on the turning signal switch 101 or the wiper switch 103, the force is transmitted to the rotary connector 121 through deformation of the base 105. There is a fear that this transmitted force deforms the rotary connector 121, thereby affecting a spiral cable, and a turning torque for the spiral cable becomes large, so that premature wear or the like develops.

On the other hand, there can be provided a structure in which the turning signal switch 101, the wiper switch 103 and the rotary connector 121 are separately fixed to the steering column 127.

In this case, however, the turning signal switch 101, the wiper switch 103 and the rotary connector 121 must be handled separately until these parts are mounted on the steering column 127, and therefore there is a fear that the assembling operation, the management of the parts, the transport of the parts, etc., become cumbersome.

Patent Literature 1 Japanese Patent Unexamined Publication No. JP-A-09-320724

Patent Literature 2 Japanese Patent Unexamined Publication No. JP-A-2002-14495

SUMMARY OF THE INVENTION

The problem to be solved is that when the lever switches and the rotary connector are combined into a sub-assembly, and then are mounted on the steering column, an unduly-large force, acting on the lever switch and others, affects the rotary connector, and on the other hand when the lever switches and the rotary connector are mounted separately on the steering column, the assembling operation, the management of the parts, the transport of the parts, etc., become cumbersome.

An object of the present invention is to provide a structure in which a rotary connector and a lever switch can be combined into a sub-assembly, and besides even when an unduly-large force acts on the lever switch, an adverse effect of this force on the rotary connector can be suppressed. This object has been achieved by the structure of the invention particularly characterized in that this structure comprises a provisionally-retaining means for provisionally retainingly engaging the lever switch and the rotary connector with each other before the lever switch and the rotary connector are mounted respectively on a switch mounting portion and a connector mounting portion; and a connecting portion which is provided at the lever switch, and is opposed to the switch mounting portion with a gap formed therebetween when the rotary connector, provisionally retainingly engaged with the lever switch, is mounted on the connector mounting portion; and when the connecting portion is moved together with the lever switch in a direction to eliminate the gap, and is connected to the switch mounting portion, the provisionally-retained condition of the provisionally retaining means is canceled.

The lever switch mounting structure of the present invention comprises the provisionally-retaining means for provisionally retainingly engaging the lever switch and the rotary connector with each other before the lever switch and the rotary connector are mounted respectively on the switch mounting portion and the connector mounting portion; and the connecting portion which is provided at the lever switch, and is opposed to the switch mounting portion with the gap formed therebetween when the rotary connector, provisionally retainingly engaged with the lever switch, is mounted on the connector mounting portion; and when the connecting portion is moved together with the lever switch in the direction to eliminate the gap, and is connected to the switch mounting portion, the provisionally-retained condition of the provisionally retaining means is canceled. Therefore, the rotary connector and the lever switch are provisionally retainingly engaged with each other by the provisionally retaining means, and therefore are combined into the sub-assembly, and by doing so, the assembling operation, the management of the parts, the transport of the parts, etc., can be easily carried out.

And besides, after the rotary connector and the lever switch are mounted respectively on the connector mounting portion and the switch mounting portion, the rotary connector and the lever switch can be disengaged from each other, and even when an unduly-large force acts on the lever switch, this force is inputted to the steering column via the switch mounting portion, so that an adverse effect of this force on the rotary connector can be suppressed.

Preferably, the provisionally-retaining means includes a provisionally retaining projection formed on one of the rotary connector and the lever switch, and a provisionally retaining hole which is formed in the other of the rotary connector and the lever switch, and can be fitted on the provisionally retaining projection in a provisionally retained condition. In this case, the provisionally retaining engagement is effected by engaging the provisionally retaining projection in the provisionally retaining hole, and by doing so, the lever switch and the rotary connector can be easily combined into the sub-assembly.

Preferably, the provisionally retaining hole has an insertion slit to which the provisionally retaining projection is inserted. In this case, the provisionally retaining projection can be inserted laterally into the provisionally retaining hole via the insertion slit, and is fitted in this provisionally retaining hole in a provisionally retained condition. Therefore, the lever switch can be easily provisionally retainingly engaged with the rotary connector.

In the case where there are provided two lever switches which are a turning signal switch and a wiper switch, respectively, the turning signal switch and the wiper switch are provisionally retainingly engaged with the rotary connector to easily form the sub-assembly, and even when a unduly-large force acts on the turning signal switch or the wiper switch, an adverse effect of this force on the rotary connector can be suppressed.

DETAILED DESCRIPTION OF THE INVENTION

The object of the invention is to provide the structure in which the rotary connector and the lever switch can be combined into the sub-assembly, and besides even when an unduly-large force acts on the lever switch, an adverse effect of this force on the rotary connector can be suppressed. This object has been achieved by provisionally retainingly engaging the lever switch with the rotary connector and by canceling this provisional retaining engagement.

First Embodiment

Figure 1:
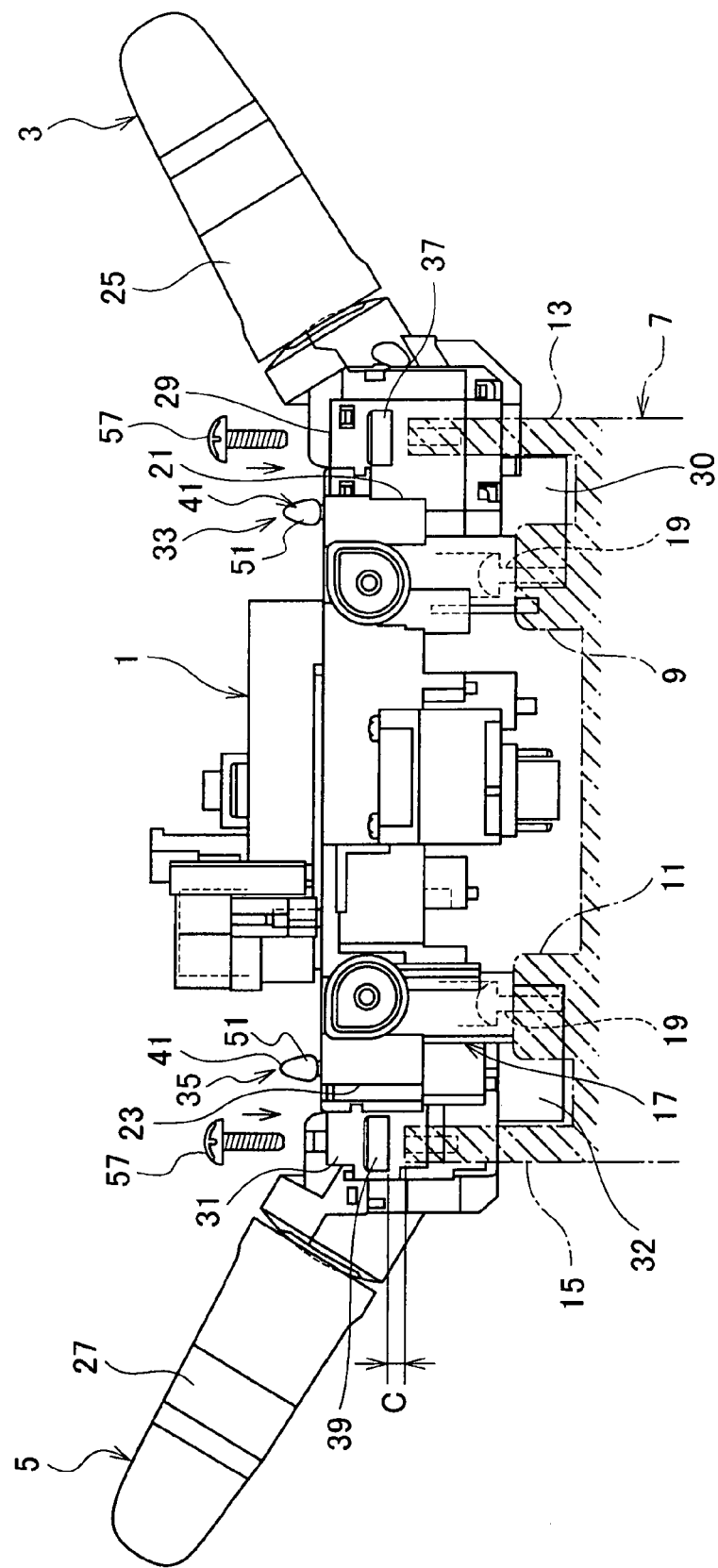
FIG. 1 is a side-elevational view of a combination switch device, showing the relation between lever switches and a rotary connector (a first embodiment)
Figure 2:
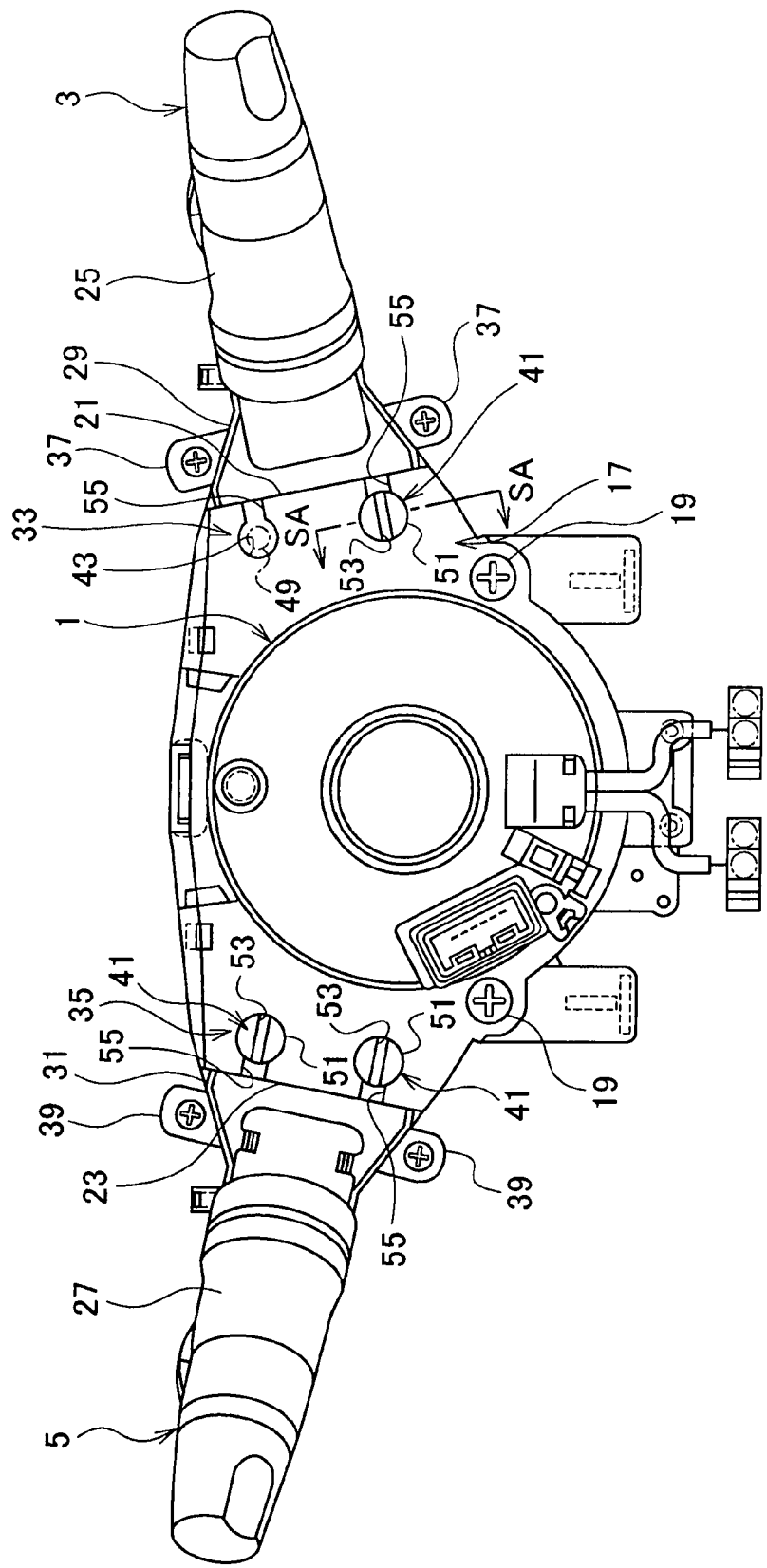
FIG. 2 is a plan view of the combination switch device, showing the relation between the lever switches and the rotary connector (the first embodiment)

FIGS. 1 and 2 are a side-elevational view and a plan view of a combination switch device, (to which a first embodiment of the present invention is applied), respectively, showing the relation between lever switches and a rotary connector. As shown in FIGS. 1 and 2, the rotary connector 1 and the lever switches (that is, a turning signal switch 3 and a wiper switch 5) are all mounted on a mounting bracket 7.

The mounting bracket 7 is fixed to a steering column, and includes connector mounting seats (connector mounting portions) 9 and 11, and switch mounting seats (switch mounting portions) 13 and 15. For example, the connector mounting seats 9 and 11 are provided at two sections of the mounting bracket, respectively. For example, the switch mounting seats 13 are provided at two sections disposed near to the turning signal switch 3, and the switch mounting seats 15 are provided at two sections disposed near to the wiper switch 5.

The rotary connector 1 is fixedly secured to the connector mounting seats 9 and 11. The rotary connector 1 has a spiral cable, and electrically connects the steering column-side to a steering wheel-side. A bottom casing 17 of this rotary connector is fixedly secured to the connector mounting seats 9 and 11 by screws 19.

Switch mounting ports 21 and 23 are formed in opposite (left and right) side portions of the bottom casing 17, respectively. Each of the switch mounting ports 21 and 23 is laterally open. The turning signal switch 3 can be inserted laterally into the switch mounting port 21 to be mounted therein in a fitted condition, while the wiper switch 5 can be inserted laterally into the switch mounting port 23 to be mounted therein in a fitted condition.

The turning signal switch 3 which is fixedly mounted in the switch mounting port 21 includes a switch lever 25, and a switch casing 29. The wiper switch 5 which is fixed mounted in the switch mounting port 23 includes a switch lever 27, and a switch casing 31. A moving contact, fixed contacts, etc., (which are function parts) forming the switch, are provided within each of the switch casings 29 and 31. Each moving contact is moved by operating the switch lever 25, 27, and in the turning signal switch 3, a turning signal and so on are operated, while in the wiper switch 5, a wiper, a wiper washer and so on are operated.

Electrical connection of the turning signal switch 3 is effected by a connector 30 provided at the switch casing 29, while electrical connection of the wiper switch 5 is effected by a connector 32 provided at the switch casing 31.

Provisionally-retaining means 33 is provided between the turning signal switch 3 and the rotary connector 1, and provisionally-retaining means 35 is provided between the wiper switch 5 and the rotary connector 1.

The provisionally-retaining means 33 serves to provisionally retainingly engage the turning signal switch 3 with the rotary connector 1. The provisionally-retaining means 35 serves to provisionally retainingly engage the wiper switch 5 with the rotary connector 1.

Fastening tongue portions 37 (serving as connecting portions) are formed at the switch casing 29 of the turning signal switch 3, and fastening tongue portions 39 (serving as connecting portions) are formed at the switch casing 31 of the wiper switch 5. As shown in FIG. 2 which is a plan view, the fastening tongue portions 37 are provided respectively at the opposite sides of the switch casing 29, while the fastening tongue portions 39 are provided respectively at opposite sides of the switch casing 31. The turning signal switch 3 and the wiper switch 5 are provisionally retainingly engaged with the rotary connector 1, and in this condition, when the rotary connector 1 is fixed to the connector mounting seats 9 and 11 as shown in FIG. 1, each fastening tongue portion 37 is opposed to the corresponding switch mounting seat 13, with a gap C formed therebetween, while each fastening tongue portion 39 is opposed to the corresponding switch mounting seat 15, with a gap C formed therebetween.

Figure 3:
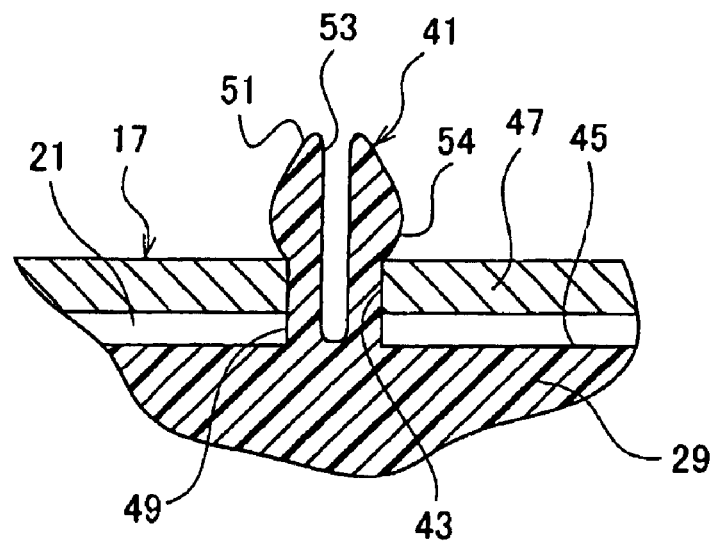
FIG. 3 is a cross-sectional view taken along the line SA-SA of FIG. 2.
Figure 4:
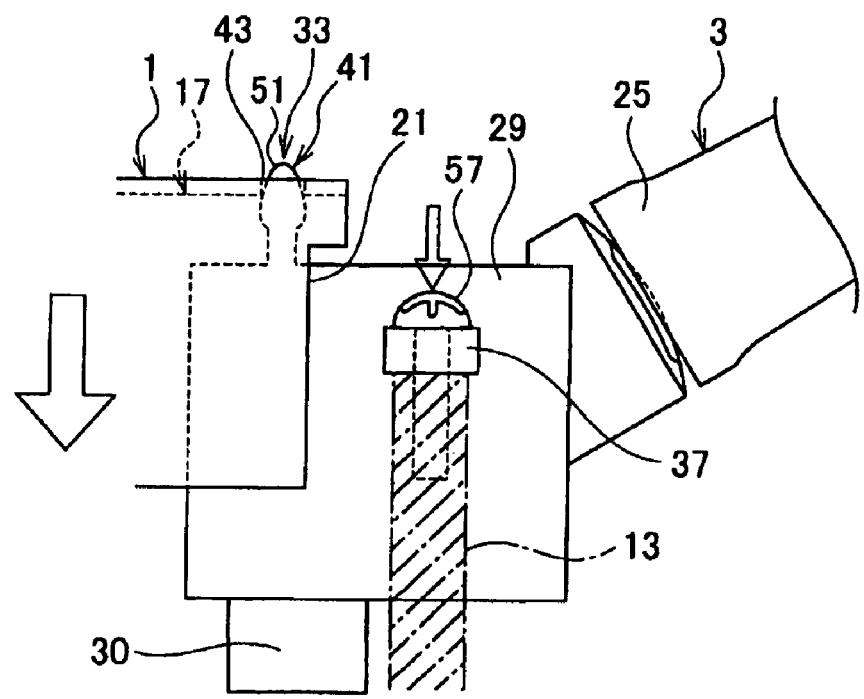
FIG. 4 is an enlarged front-elevational view of an important portion, showing a condition in which the combination switch device is fixed to a mounting bracket (the first embodiment)
Figure 5:
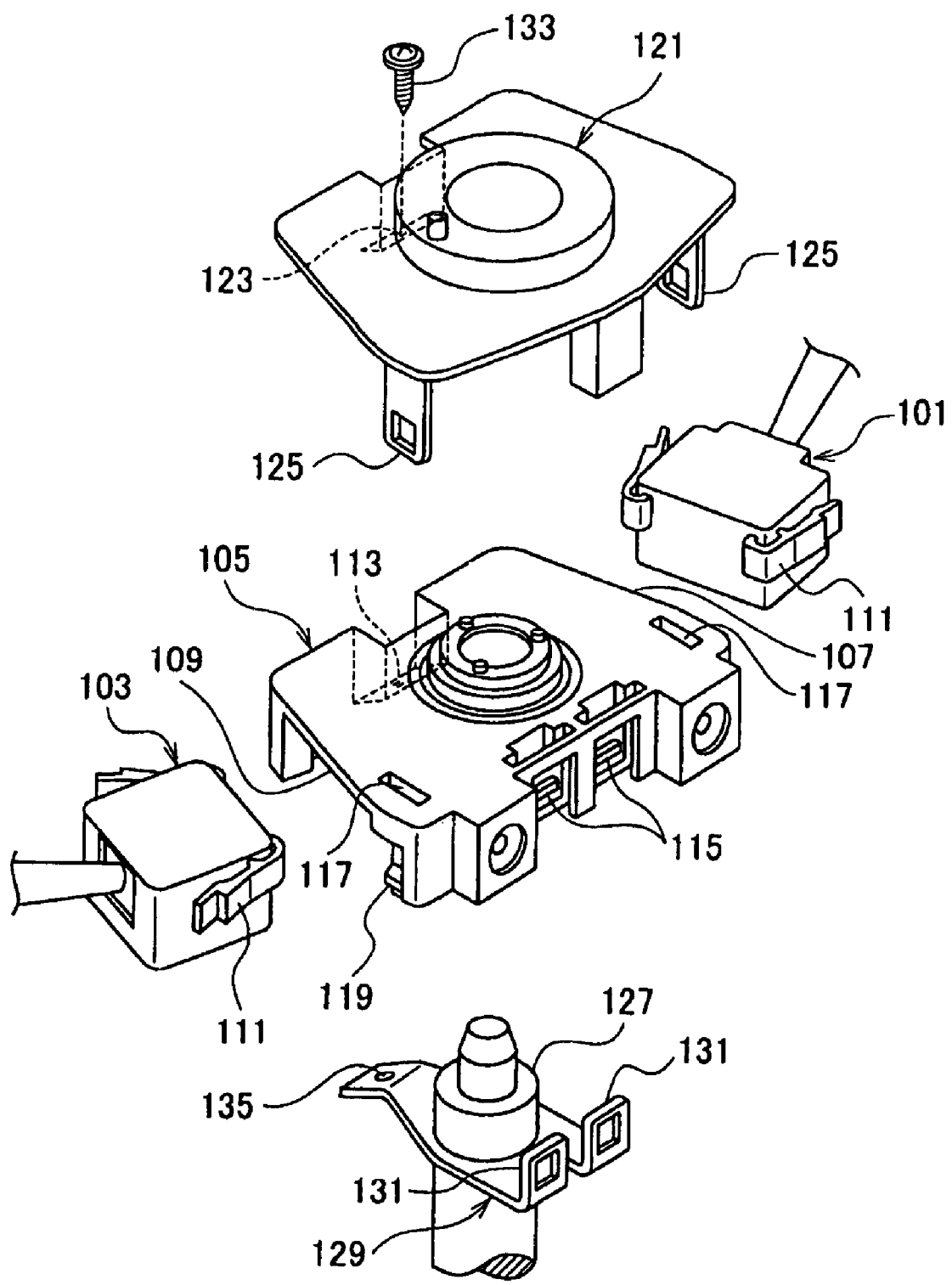
FIG. 5 is an exploded, perspective view of a combination switch device (a conventional example).

The provisionally-retaining means 33 will be described with reference also to FIGS. 3 and 4. FIG. 3 is an enlarged cross-sectional view of an important portion taken along the line SA-SA of FIG. 2, and FIG. 4 is an enlarged front-elevational view of an important portion, showing a condition in which the combination switch device is fixed to the mounting bracket. The provisionally-retaining means 33 and 35 have the same structure. Therefore, the construction of the provisionally-retaining means 35 will be appreciated by reference to the provisionally-retaining means 33, and detailed explanation thereof will be omitted.

As shown in FIGS. 1 to 3, the provisionally-retaining means 33 includes provisionally-retaining projections 41, and provisionally-retaining holes 43. In this embodiment, the provisionally-retaining projections 41 are formed on the switch casing 29 of the switch lever 3. The two provisionally-retaining projections 41 are disposed adjacent to the fastening tongues 37, respectively. With respect to the upper provisionally-retaining projection 41 (in FIG. 2), only a shank portion 49 thereof is indicated in a dot-and-dash line.

Each provisionally-retaining projection 41 is formed on and projects from one surface 45 of the switch casing 29 toward a wall 47 of the bottom casing 17 disposed at the switch mounting port 21. The provisionally-retaining projection 41 includes the shank portion 49, and a head 51. Flexure slit 53 is formed in the projection 41, and extends from a distal end of the head 51 into the shank portion 49. Thanks to the provision of the flexure slit 53, the head 51 can be easily deformed into a smaller diameter. In this embodiment, although the flexure slit 53 has a straight-line shape when viewed from the head 51 of the projection 41, it can has any other suitable shape such as a cross-shape. The head 51 is tapering toward its distal end, and has a bulge portion 54 of an axially arcuately-curved contour formed at its proximal end portion in coaxial relation to the provisionally-retaining projection 41.

Thanks to the provision of the bulge portion 54 of the arcuate contour and the flexure slit 53, the provisionally-retaining projection 41 can be easily disengaged from the provisionally-retaining hole 43. In order that the provisionally-retaining projection can be more easily disengaged from the provisionally-retaining hole, for example, the thickness of the provisionally-retaining projection 41 (that is, its dimension in a direction perpendicular to the flexure slit 53) can be made equal to the diameter of the provisionally-retaining hole 43.

The provisionally-retaining hole 43 is so designed as to fit on the shank portion 49 of the provisionally-retaining projection 41. The provisionally-retaining hole 43 has an insertion slit 55. The shank portion 49 of the provisionally-retaining projection 41 can be inserted laterally into the insertion slit 55 so as to enable the provisionally-retaining projection 41 to be retainingly engaged in the provisionally-retaining hole 43. Each insertion slit 55 is formed in an edge portion of the switch mounting port 21, and extends straight between the edge of the switch mounting port 21 and the provisionally-retaining hole 43 in the lateral direction along which the switch casing 29 of the turning signal switch 3 is inserted into the switch mounting port 21. The insertion slit 55 has such a width (which is smaller than the diameter of the provisionally-retaining hole 43) as to allow the shank portion 49 of the provisionally-retaining projection 41 to easily pass therethrough.

Before the rotary connector 1, the turning signal switch 3 and the wiper switch 5 are mounted on their respective mounting seats, the turning signal switch 3 is beforehand mounted in the switch mounting port 21 of the bottom casing 17, while the wiper switch 5 is beforehand mounted in the switch mounting port 23. These mounting operations are carried out by the provisional-retaining operation by the provisionally-retaining means 33 and 35. This provisionally-retaining operation will be described with respect to the turning signal switch 3.

The switch casing 29 of the turning signal switch 3 is laterally opposed to the switch mounting port 21 of the bottom casing 17. Then, the switch casing 29 is inserted laterally into the switch mounting port 21, and therefore is fitted therein in a supported condition. In this inserting operation, the shank portion 49 of each provisionally-retaining projection 41 on the switch casing 29 passes through the insertion slit 55 of the provisionally-retaining hole 43 in the switch mounting port portion 21, and the provisionally-retaining projection 41 is brought into provisionally retaining engagement with the corresponding provisionally-retaining hole 43 as shown in FIGS. 1 to 3. In this provisionally retainingly engaged condition, the head 51 of the provisionally-retaining projection 41 projects upwardly beyond the switch mounting port 21.

The provisionally-retaining operation is carried out similarly for the wiper switch 5. The turning signal switch 3 and the wire switch 5 are provisionally retainingly engaged with the bottom casing 17 of the rotary connector 1, and therefore the rotary connector 1, the turning signal switch 3 and the wiper switch 5 can be combined into a sub-assembly.

Therefore, the rotary connector 1, the turning signal switch 3 and the wiper switch 5 can be handled as a unit, and the management of the parts and the transport of the parts can be carried out quite easily.

And besides, when the rotary connector 1, the turning signal switch 3 and the wiper switch 5 are to be mounted on the mounting bracket 7 on the steering column, these parts can be handled as the unit.

Namely, the turning signal switch 3 and the wiper switch 5 are provisionally retainingly engaged with the rotary connector 1, and in this condition the rotary connector 1 is held against the connector mounting seats 9 and 11, and is fixedly fastened thereto by the screws 19. As a result of this fixedly fastening operation, each of the fastening tongue portions 37 of the turning signal switch 3 is opposed to the corresponding switch mounting seat 13 of the mounting bracket 7, with the gap C formed therebetween, while each of the fastening tongue portions 39 of the wiper switch 5 is opposed to the corresponding switch mounting seat 15 of the mounting bracket 7, with the gap C formed therebetween.

In this condition, the fastening tongue portions 37 are fastened respectively to the switch mounting seats 13 by respective screws 57, while the fastening tongue portions 39 are fastened respectively to the switch mounting seats 15 by respective screws 57. As a result of this fastening operation, the fastening tongues 37 and 39 move together with the turning signal switch 3 and the wiper switch 5 in a direction to eliminate the gaps C as shown in FIG. 4. In this moving operation, a force is applied to each provisionally-retaining projection 41 to withdraw it from the mating provisionally-retaining hole 43. At this time, the head 51 of the provisionally-retaining projection 41 is elastically deformed so as to narrow the flexure slit 53. As a result of this deformation, the head 51 is disengaged from the provisionally-retaining hole 43.

Therefore, when the fastening tongue portions 37 and 39 of the turning signal switch 3 and wiper switch 5 are fixedly fastened respectively to the switch mounting seats 13 and 15, with the gaps C eliminated, the provisionally retaining engagement of the turning signal switch 3 and wiper switch 5 with the rotary connector 1 is canceled. As a result of this cancellation of the provisionally retaining engagement, there is achieved a condition in which the rotary connector 1, the turning signal switch 3 and the wiper switch 5 are separately fastened or fixed to the mounting bracket 7.

Therefore, even when an unduly-large force acts on the turning signal switch 3 or the wiper switch 5, this force is transmitted to the mounting bracket 7 via the switch mounting seats 13 or 15. Therefore, a large force is prevented from being transmitted directly to the rotary connector 1 from the turning signal switch 3 or the wiper switch 5.

Thus, the deformation of the bottom casing 17, etc., of the rotary connector 1 can be suppressed, and a turning torque for the spiral cable within the rotary connector is prevented from becoming large, thereby properly maintaining its operation, and therefore the positive operation can be maintained, and also the durability can be enhanced.

In the above embodiment, although the turning signal switch 3 and the wiper switch 5 are inserted laterally into the bottom casing 17 of the rotary connector 1 to be fitted therein, and are provisionally retainingly engaged with this bottom casing, there can be adopted a construction in which each provisionally-retaining projection 41 is moved axially to be inserted into the provisionally-retaining hole 43 so as to mount each switch in the bottom casing in the provisionally retainingly engaged condition. Namely, in FIG. 1, the switch casings 29 and 31 are not inserted and fitted into the bottom casing 17 respectively from the right and left sides, and instead there can be provided a construction in which the switch casings 29 and 31 are inserted and fitted into the switch mounting ports 21 and 23 from the lower side in FIG. 1.

In the above embodiment, although the provisionally-retaining means 33 and 35 are particularly provided, there can be provided, for example, a construction in which the connectors 30 and 32 for respectively electrically connecting the turning signal switch 3 and the wiper switch 5 are provisionally retainingly engaged with the bottom casing 17 of the rotary connector 1, and the turning signal switch 3 and the wiper switch 5 are inserted respectively into these connectors, and are connected thereto, and thereafter the two switches 3 and 5 are fastened to the bottom casing 17 in a manner to eliminate gaps C as in the above embodiment, and by doing so, the connectors are moved together with the turning signal switch 3 and the wiper switch 5, respectively, thereby canceling the provisional retaining of the connectors 30 and 32 relative to the bottom casing 17.

Although the fastening tongue portions 37 and 39 are fixedly fastened to the switch mounting seats 13 and 15, respectively, this fastening structure can be replaced by a snap-fastening structure utilizing the elasticity of a resin.

What is claimed is:

1. A lever switch mounting structure comprising:
   a rotary connector mounted on a connector mounting portion provided on a steering column, containing a spiral cable, and electrically connecting the steering column side to a steering wheel side;
   at least one of lever switches mounted on a switch mounting portion provided on the steering column, and comprising a switch lever operable to operate a function part;
   a provisionally-retaining means for provisionally retainingly engaging the lever switch side and the rotary connector side with each other before the lever switch and the rotary connector are mounted respectively on the switch mounting portion and the connector mounting portion; and
   a connecting portion which is provided at the lever switch, and is opposed to the switch mounting portion with a gap formed therebetween when the rotary connector, provisionally retainingly engaged with the lever switch, is mounted on the connector mounting portion;
   wherein when the connecting portion is moved together with the lever switch in a direction to eliminate the gap, and is connected to the switch mounting portion, the provisionally-retained condition of the provisionally retaining means is canceled.

2. The lever switch mounting structure according to claim 1, wherein the provisionally-retaining means comprises:
   a provisionally retaining projection formed on one of the rotary connector and the lever switch, and
   a provisionally retaining hole which is formed in the other of the rotary connector and the lever switch, and is adopted to be provisionally retainingly fitted on the provisionally retaining projection.

3. The lever switch mounting structure according to claim 2, wherein the provisionally retaining hole comprises an insertion slit to which the provisionally retaining projection is inserted.

4. The lever switch mounting structure according to claim 1 or 2, wherein one of the lever switch is a turning signal switch and another lever switch is a wiper switch.

5. A lever switch mounting structure, comprising:
   a rotary connector mounted on a connector mounting portion provided on a steering column, containing a spiral cable, and electrically connecting the steering column side to a steering wheel side;
   at least one lever switch being mounted on a switch mounting portion provided on the steering column, the lever switch including a switch lever operable to operate a function part;
   a provisionally-retaining part for provisionally retainingly engaging the lever switch side and the rotary connector side with each other before the lever switch and the rotary connector are mounted respectively on the switch mounting portion and the connector mounting portion, the provisionally-retaining part comprising an engaging portion formed on one of the rotary connector or the lever switch and a receiving portion formed on another of the rotary connector or the lever switch, the engaging portion engaging the receiving portion to be disengageable from the receiving portion in a mounting direction of the rotary connector and the lever switch; and
   a connecting portion which is provided at the lever switch and which is configured to oppose the switch mounting portion with a gap formed therebetween in the mounting direction when the lever switch is provisionally retainingly engaged with the rotary connector that is mounted on the connector mounting portion; and
   the lever switch configured to be mounted on the switch mounting portion and move away from the rotary connector to disengage the engaging portion and the receiving portion and cancel a provisionally-retained condition of the provisionally retaining part by the connecting portion moving so as to eliminate the gap and being connected to the switch mounting portion.

6. A lever switch mounting structure, comprising:
   a rotary connector mountable on a connector mounting portion provided on a steering column, said connector mounting portion including at least one connector mounting seat against which said rotary connector is seatably fastenable;
   at least one lever switch being mountable on a switch mounting portion provided on the steering column, said switch mounting portion including at least one switch mounting seat, said at least one lever switch including at least one connecting portion seatably engageable with said at least one switch mounting seat;
   a provisionally-retaining part for provisionally retainingly engaging the at least one lever switch and the rotary connector with one another before the at least one lever switch and the rotary connector are fastenably mounted respectively on the switch mounting portion and the connector mounting portion in seated engagement therewith, the provisionally-retaining part comprising mutually engaging structural portions carried respectively on the rotary connector and the lever switch, the mutually engaging structural portions being engageable one to another to establish a provisionally-retained condition of the at least one lever switch and the rotary connector defining a provisionally retainingly engaged assembly prior to fastenable mounting thereof respectively to the switch mounting portion and the connector mounting portion, said a provisionally retainingly engaged assembly having a configuration such that when said rotary connector is brought into seated engagement with said at least one connector mounting seat, a gap is present between said at least one connecting portion and said at least one switch mounting seat, movement of said at least one connecting portion so as to eliminate said gap being effective for causing disengagement of the mutually engaging structural portions by relative movement between the rotary connector and the at least one lever switch.

7. The lever switch mounting structure according to claim 5 or 6, wherein the provisionally-retaining part comprises:
   a provisionally retaining projection formed on one of the rotary connector or the lever switch; and
   a provisionally retaining hole which is formed in a remaining one of the rotary connector and the lever switch, said provisionally retaining hole being configured to be provisionally retainingly fitted on the provisionally retaining projection.

8. The lever switch mounting structure according to claim 7, wherein the provisionally retaining hole comprises an insertion slit to which the provisionally retaining projection is insertable.

9. The lever switch mounting structure according to claim 5 or 6, wherein said at least one lever switch includes a turning signal switch and a wiper switch.

* * * * *